United States Patent
Jacobs et al.

(10) Patent No.: US 8,398,103 B2
(45) Date of Patent: Mar. 19, 2013

(54) AUXILIARY FRAME

(75) Inventors: Imre Peter Jacobs, Utrecht (NL); Sander van Oosterum, Amsterdam (NL); Therese Johansson, Amsterdam (NL); Maurits Homan, Amsterdam (NL)

(73) Assignee: Nuna International B.V., Amsterdam (NL)

( * ) Notice: Subject to any disclaimer, the term of this patent is extended or adjusted under 35 U.S.C. 154(b) by 420 days.

(21) Appl. No.: 12/628,926

(22) Filed: Dec. 1, 2009

(65) Prior Publication Data

US 2010/0164199 A1 Jul. 1, 2010

Related U.S. Application Data

(60) Provisional application No. 61/200,603, filed on Dec. 2, 2008.

(51) Int. Cl.
*B62J 7/04* (2006.01)
*B62J 9/00* (2006.01)

(52) U.S. Cl. ........ 280/202; 224/425; 224/434; 224/452; 224/454

(58) Field of Classification Search .................. 280/202, 280/152.1, 288.4, 304.5; 224/412, 418, 425, 224/429, 434, 442, 451, 452, 458, 430, 422, 224/459, 457, 449, 440, 254
See application file for complete search history.

(56) References Cited

U.S. PATENT DOCUMENTS

| | | | | | |
|---|---|---|---|---|---|
| 2,128,174 | A | * | 8/1938 | Smith | 224/433 |
| 2,459,249 | A | * | 1/1949 | Sternad | 224/449 |
| 2,498,663 | A | * | 2/1950 | Easley | 224/432 |
| 2,675,151 | A | * | 4/1954 | Herbert | 224/432 |
| 3,193,232 | A | * | 7/1965 | Hatcher | 248/231.81 |
| 3,220,623 | A | * | 11/1965 | Bostwick | 224/413 |
| 3,286,891 | A | * | 11/1966 | Jones, Jr. | 224/455 |
| 4,174,120 | A | | 11/1979 | Freeman | |
| 4,350,361 | A | | 9/1982 | Fujii | |
| 4,477,004 | A | * | 10/1984 | Barro | 224/445 |
| 5,285,935 | A | * | 2/1994 | Hsueh | 224/413 |
| 5,332,134 | A | * | 7/1994 | Chen | 224/422 |
| 2008/0169323 | A1 | | 7/2008 | Deitrich | |

FOREIGN PATENT DOCUMENTS

| | | |
|---|---|---|
| CN | 2460419 Y | 11/2001 |
| DE | 40 25 689 A1 | 2/1992 |
| EP | 0 018 513 A3 | 11/1980 |
| NL | 9301007 A | 1/1995 |
| NL | 1030435 C | 5/2007 |

* cited by examiner

*Primary Examiner* — Anne Marie M Boehler
(74) *Attorney, Agent, or Firm* — Kilpatrick Townsend & Stockton LLP

(57) ABSTRACT

An auxiliary frame is adapted to be mounted on a rear end of a bicycle. The auxiliary frame includes two horizontally spaced apart lateral propping members, a plank member, and a supporting frame. The plank member extends between the lateral propping members and is disposed at an end of each of the lateral propping members. The supporting frame is connected to and disposed behind the plank member.

5 Claims, 5 Drawing Sheets

AUXILIARY FRAME

CROSS-REFERENCE TO RELATED APPLICATION

This application claims priority of U.S. provisional application No. 61/200,603, filed Dec. 2, 2008, the disclosure of which is incorporated herein by reference.

BACKGROUND OP THE INVENTION

1. Field of the Invention

This invention relates to an auxiliary frame for a bicycle, more particularly to an auxiliary frame with a mudguard.

2. Description of the Related Art

When it is desired to carry a buggy in a folded state with a bicycle, an auxiliary frame for carrying the buggy is needed.

Referring to FIGS. 1 and 2, a conventional auxiliary frame 91 is adapted to be mounted in proximity to a rear wheel 921 of the bicycle 92. The auxiliary frame 91 comprises two lateral propping members 911 and a supporting frame 912. The supporting frame 912 is disposed behind the rear wheel 921, and is connected to the lateral propping members 911. The auxiliary frame 91 further comprises two pairs of hooks 913 disposed above the lateral propping members 911, and two locking units 914. Each pair of the hooks 913 is hooked on a respective one of lateral portions 923 of a carrier 922 of the bicycle 92.

The carrier 922 has a plurality of flanking rods 924 connected fixedly to lower ends of the lateral propping members 911 by use of the locking units 914 so as to fasten the auxiliary frame 91 on the carrier 922. The supporting frame 912 of the auxiliary frame 91 comprises one pair of parallel vertical portions 915 and a hook portion for supporting a buggy 93 in a folded state (see FIG. 2). Hence, it is convenient to carry the buggy 93 with the bicycle 92.

However, because of lack of a mudguard, when the bicycle 92 passes by a pool of water on the ground, the buggy 93 may get dirty and components inside the buggy 93 may be damaged by water and mud during rotation of the rear wheel 921.

SUMMARY OF THE INVENTION

Therefore, the object of the present invention is to provide an auxiliary frame capable of alleviating the above drawback of the prior art.

Accordingly, an auxiliary frame of the present invention is adapted to be mounted on a bicycle, and includes two horizontally spaced apart lateral propping members, a plank member, and a supporting frame. The plank member extends between the lateral propping members, and is disposed at an end of each of the lateral propping members. The supporting frame is connected to and is disposed behind the plank member.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
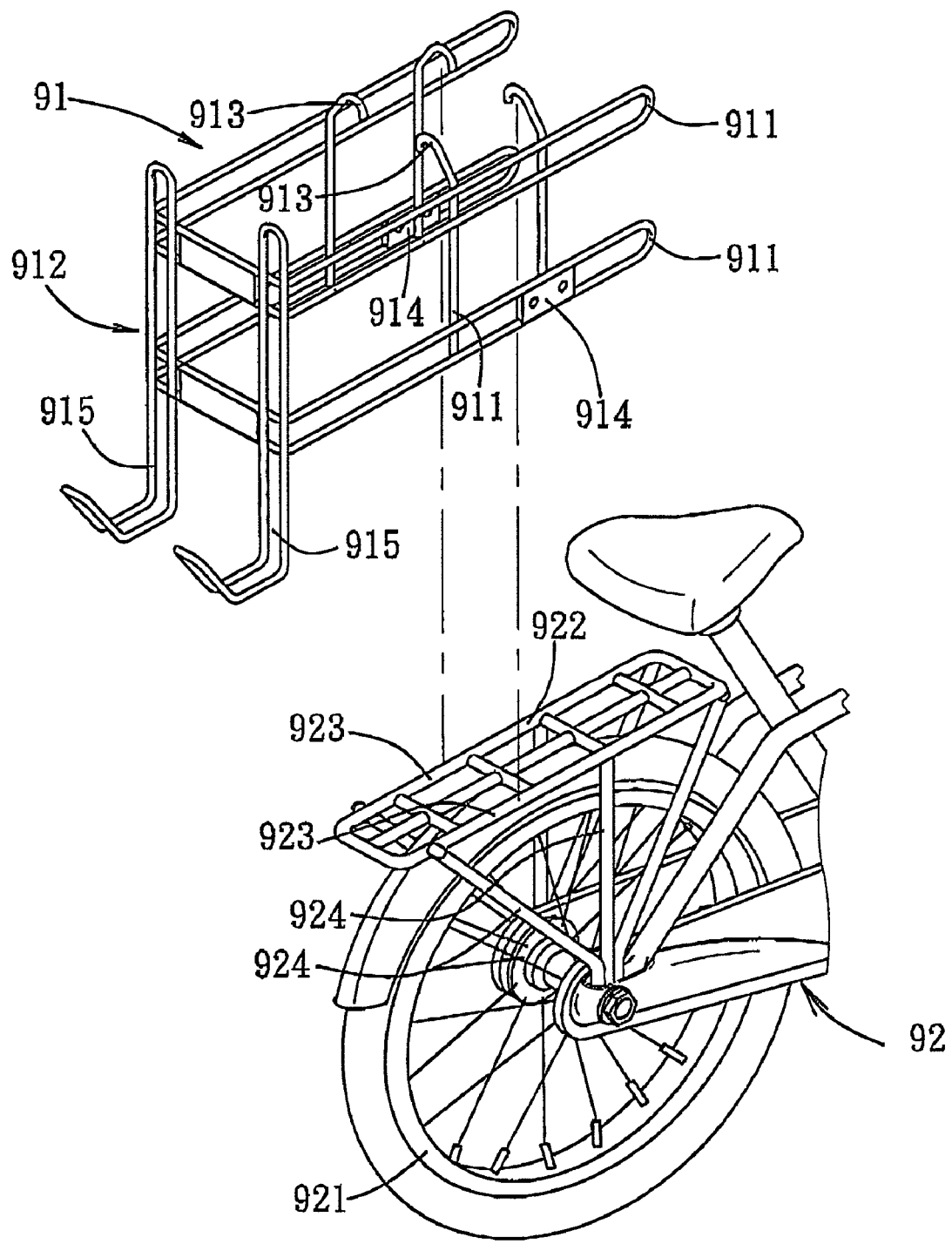
FIG. 1 is a perspective view of a conventional auxiliary frame adapted to be mounted on a bicycle.
Figure 2:
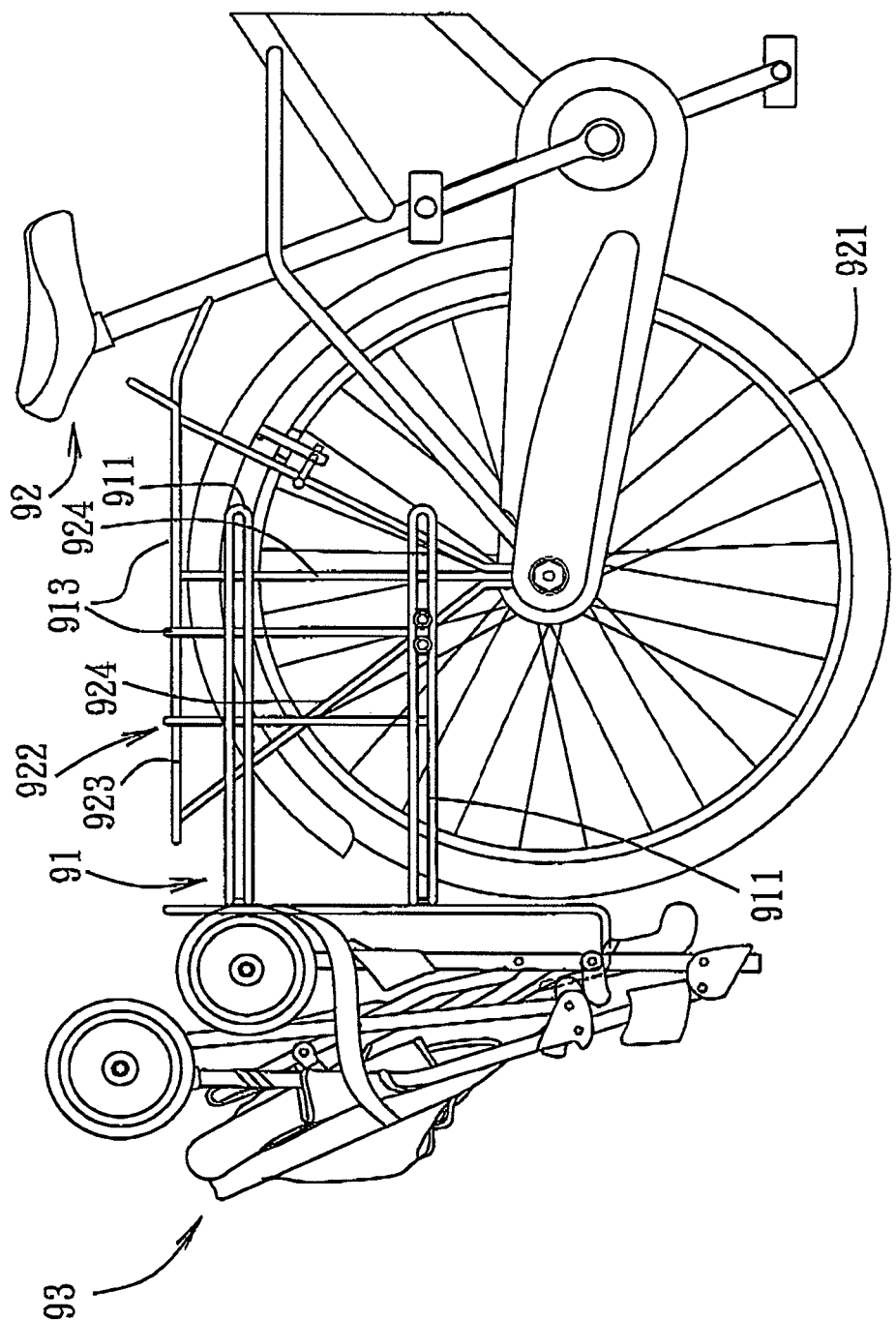
FIG. 2 is a side view of the conventional auxiliary frame carrying a folded buggy.

Before the present invention is described in greater detail, it should be noted that like reference numerals are used to indicate corresponding or analogous elements throughout the accompanying disclosure.

Figure 3:
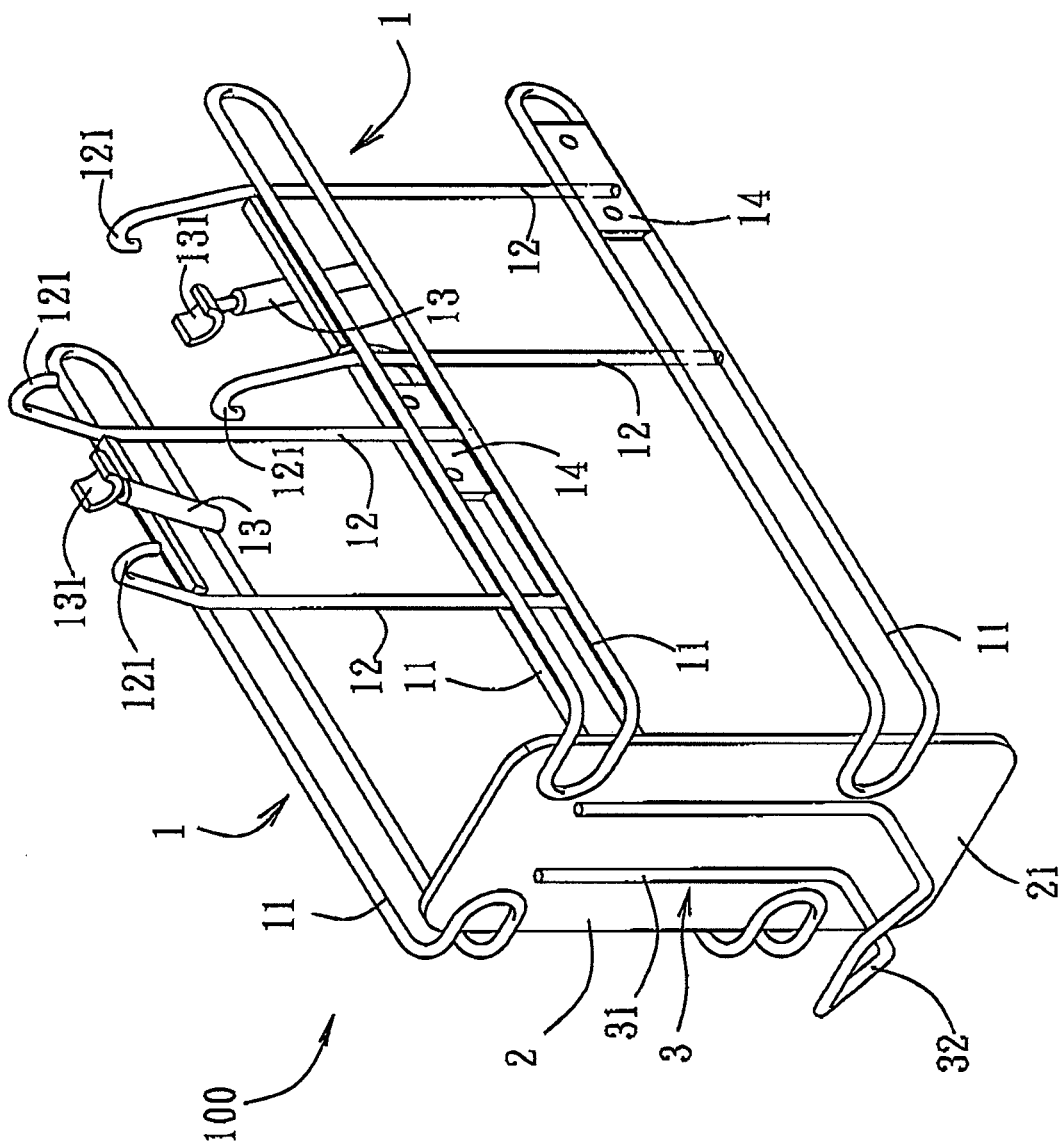
FIG. 3 is a perspective view of a first preferred embodiment of an auxiliary frame adapted to be mounted on a carrier of a bicycle according to the present invention.
Figure 4:
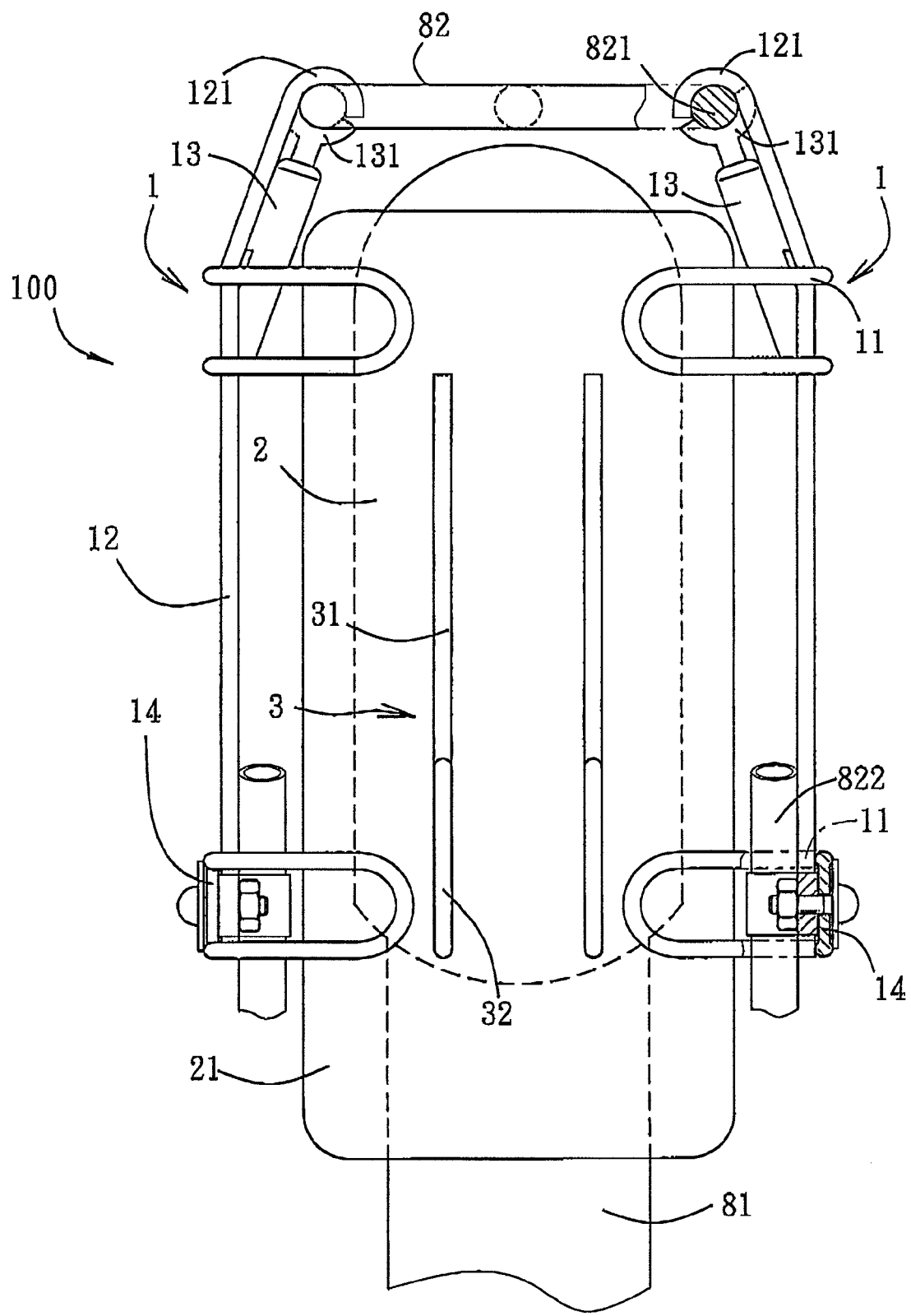
FIG. 4 is a party sectional schematic rear view of the first preferred embodiment and the carrier.

Referring to FIGS. 3 and 4, a first preferred embodiment of an auxiliary frame 100 according to the present invention is adapted to be mounted on a carrier 82 of a bicycle (not shown) above a rear wheel 81 of the bicycle. The auxiliary frame 100 comprises two horizontally spaced apart lateral propping members 1, a plank member 2, and a supporting frame 3. The lateral propping members 1 are disposed respectively at two sides of the carrier 82. Each of the lateral propping members 1 includes two long rods 11 vertically spaced apart from each other and a plurality of upright sticks 12, 13 each connected to at least one of the long rods 11. In this preferred embodiment, the lateral propping members 1 are welded onto the plank member 2. The auxiliary frame 100 is made of metal.

The upright sticks 12, 13 include four first upright sticks 12 and two second upright sticks 13. Each of the first upright sticks 12 has a hook portion 121 disposed at a top end thereof. Each of the second upright sticks 13 has a resilient fork portion 131 disposed at a top end thereof. The hook portion 121 of each of the first upright sticks 12 defines a downwardly facing opening, and the resilient fork portion 131 of each of the second upright sticks 13 defines an upwardly facing opening so as to position two lateral rods 821 of the carrier 82 of the bicycle. Each of the first upright sticks 12 is connected to the two long rods 11 of a respective one of the lateral propping members 1. Each of the second upright sticks 13 is connected to an upper one of the long rods 11 of a respective one of the lateral propping members 1.

The auxiliary frame 100 further comprises a plurality of locking units 14. Each of the locking units 14 is disposed on a lower one of the long rods 11 of a respective one of the lateral propping members 1, and is located at junction of the lower one of the long rods 11 of the respective one of the lateral propping members 1 and a corresponding one of the first upright sticks 12. The carrier 82 has a plurality of flanking rods 822 connected fixedly to the lateral rods 821. Each of the flanking rods 822 is further connected to the junction of the lower one of the long rods 11 of a respective one of the lateral propping members 1 and the corresponding one of the first upright sticks 12 by a respective one of the locking units 14 in a known manner. By use of the hook portions 121, the resilient fork portions 131 and the locking units 14, the auxiliary frame 100 is fastened on the carrier 82.

The plank member 2 extends between the lateral propping members 1, and is disposed at an end of each of the lateral propping members 1. When the auxiliary frame 100 is mounted on the bicycle, the plank member 2 is located behind the rear wheel 81.

The supporting frame 3 is connected to and disposed behind the plank member 2. The supporting frame 3 has a vertical portion 31 connected fixedly to a rear side surface of the plank member 2, and a hook portion 32 extending from the vertical portion 31 away from the plank member 2. The vertical portion 31 is disposed on a middle portion of the plank member 2, and is configured as two parallel upright rods. The hook portion 32 extends from a lower end of the vertical portion 31 and away from the plank member 2 and is located above a bottom end of the plank member 2.

A buggy (not shown) in a folded state may be hung on the supporting frame 3 and hooked on the hook portion 32. The plank member 2 is disposed between the buggy and the rear wheel 81, and shields the buggy from mud and water during biking, thus preventing components of the buggy from being damaged.

Figure 5:
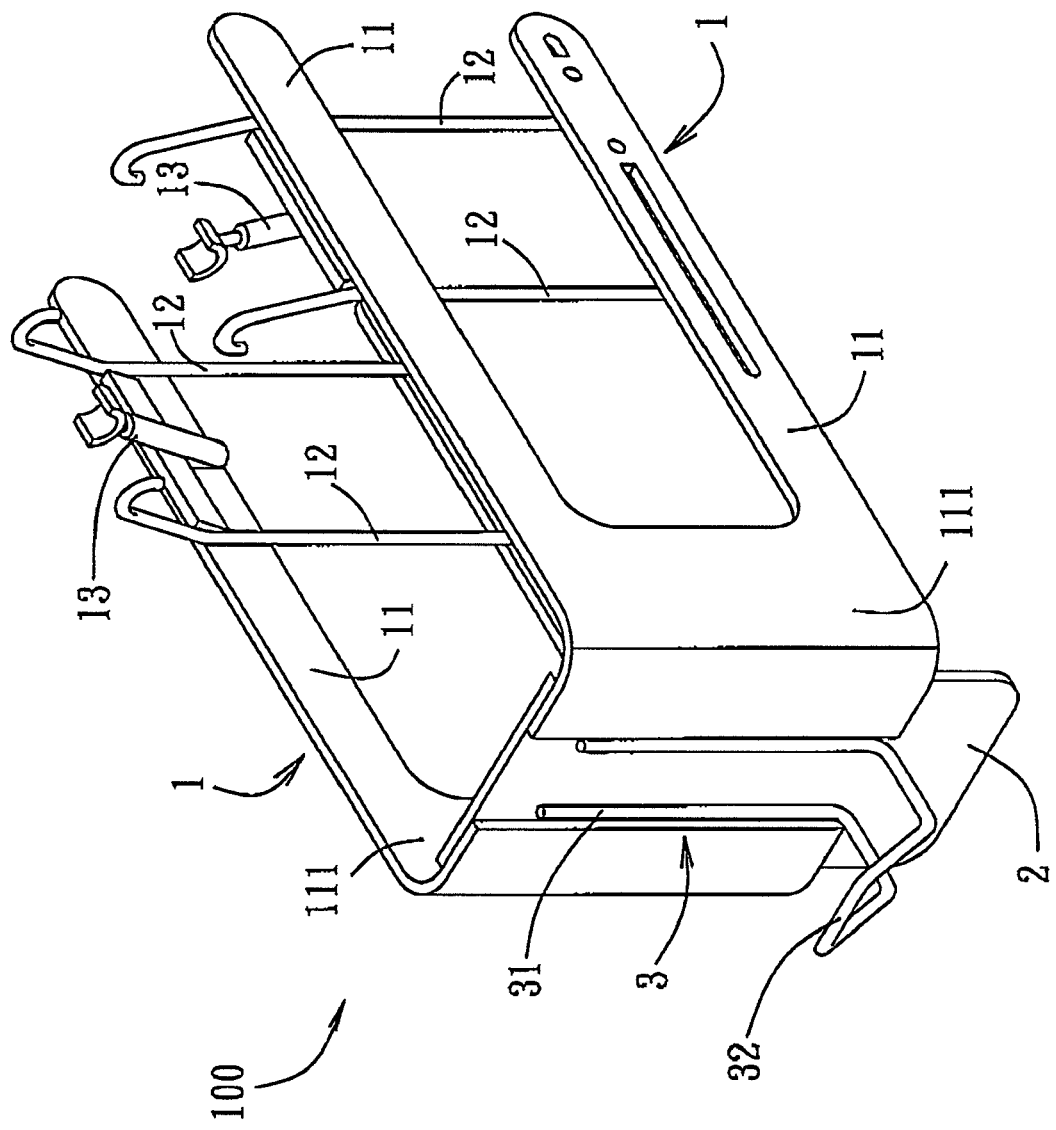
FIG. 5 is a perspective view of a second preferred embodiment of an auxiliary frame according to the present invention.

Referring to FIG. 5, a second preferred embodiment of the auxiliary frame 100 of the present invention is shown. The main difference between the second embodiment and the first embodiment resides in the following. Each of the lateral propping members 1 further includes an elongated board 111 formed integrally with the long rods 11 of a corresponding one of the lateral propping members 1, and having a rear end connected to the plank member 2. In this preferred embodiment, the plank member 2 and the elongated boards 111 of the lateral propping members 1 are riveted together. The second preferred embodiment has the same advantages as those of the first preferred embodiment.

To sum up, the advantage of the auxiliary frame 100 adapted to be mounted on the carrier 82 of the bicycle according to the present invention is as follows. In the present invention, the plank member 2 is disposed between the buggy and the rear wheel 81, thus preventing the buggy from getting dirty and components of the buggy from being damaged during biking.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An auxiliary frame configured to be mounted on a rear end of a bicycle, said auxiliary frame comprising:

two horizontally spaced apart lateral propping members, wherein each of said lateral propping members comprises two long rods vertically spaced apart from each other, and a plurality of upright sticks each connected to at least one of said long rods, wherein said upright sticks comprise a first upright stick having a hook portion disposed at a top end thereof, and a second upright stick having a resilient fork portion disposed at a top end thereof;

a plank member extending between said lateral propping members, and disposed at an end of each of said lateral propping members; and a supporting frame connected to and disposed behind said plank member, wherein said supporting frame comprises a lower end located above a bottom end of said plank member.

2. The auxiliary frame as claimed in claim 1, wherein said long rods of said lateral propping members are welded onto said plank member.

3. The auxiliary frame as claimed in claim 1, wherein each of said lateral propping members further comprises an elongated board formed integrally with said long rods of a corresponding one of said lateral propping members, and comprising a rear end connected to said plank member.

4. The auxiliary frame as claimed in claim 1, wherein said supporting frame comprises a vertical portion connected fixedly to said plank member, and a hook portion extending from said vertical portion away from said plank member.

5. The auxiliary frame as claimed in claim 1, wherein said plank member is a mudguard and said frame is configured for said mudguard to shield said object from water and mud flung off said rear wheel of said bicycle when said bicycle is in motion.

* * * * *